(12) United States Patent
Ford

(10) Patent No.: US 6,843,503 B2
(45) Date of Patent: Jan. 18, 2005

(54) CONTROLLED VENTING APPARATUS AND METHOD THEREFOR

(75) Inventor: Brian C. Ford, Mt. Clemens, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 10/420,554

(22) Filed: Apr. 22, 2003

(65) Prior Publication Data
US 2003/0222442 A1 Dec. 4, 2003

Related U.S. Application Data
(60) Provisional application No. 60/384,227, filed on May 30, 2002.

(51) Int. Cl.⁷ ............................................. B60R 21/28
(52) U.S. Cl. ..................... 280/739; 280/728.2; 280/731
(58) Field of Search ................................. 280/739, 731, 280/728.2

(56) References Cited

U.S. PATENT DOCUMENTS

| | | | |
|---|---|---|---|
| 5,234,229 A | 8/1993 | Gordon | |
| 5,799,974 A | 9/1998 | Honda | |
| 6,736,425 B2 * | 5/2004 | Lemon et al. | ............... 280/739 |
| 2002/0089159 A1 | 7/2002 | Fischer et al. | |

* cited by examiner

Primary Examiner—Eric Culbreth
(74) Attorney, Agent, or Firm—Markell Seitzman

(57) ABSTRACT

An air bag module (100) comprising: a housing (20) including a receiving feature (20a) to receive at least a portion of an inflator (20), the inflator providing inflation gas to a cooperating air bag; this inflator being removably received in the receiving feature (20a); a holding member (40) movable between a first position and a second position, the holding member, while in the first position operatively holding an inflator (30) to a housing (20), the holding member movable between the first and the second positions under the influence of the inflator.

10 Claims, 4 Drawing Sheets

CONTROLLED VENTING APPARATUS AND METHOD THEREFOR

This application claims the benefit of U.S. Provisional Application No. 60/384,227, filed on May 30, 2002. The disclosure of the above application is incorporated herein by reference.

BACKGROUND AND SUMMARY OF THE INVENTION

The present invention generally relates to air bag modules and more particularly to modules that can be vented.

It is well known in the industry, an occupant who is located too close to an air bag (an out-of-position-occupant) may have an increased risk of injury due to a deploying air bag.

One reason for some of these injuries, especially those in North America, is air bag modules are designed to protect occupants who are "in position" but not wearing a seat belt. As a result high output inflators are needed to provide air bag cushion pressures needed to absorb the impact energy of an unbelted occupant. Unfortunately, when these higher-pressure cushions and the "out-of-position" occupant interact, significant energy is transferred to the occupant and there is a potential for injury.

In addition, it would be possible to reduce injuries to an in-position occupant during "ride down" of the cushion if it were possible to initiate venting at specific times. The prior art shows the use of vents including circular vents, within the air bag (cushion), which do not offer sufficient operational flexibility.

The present invention provides a solution to this problem as well as an improved air bag module. Accordingly the invention comprises: an air bag module (100) comprising: a housing (20) including a receiving feature (20a) to receive at least a portion of an inflator (20), the inflator providing inflation gas to a cooperating air bag; the inflator being removably received in the receiving feature (20a); a holding member (40) movable between a first position and a second position, the holding member, while in the first position operatively holding an inflator (30) to a housing (20), the holding member movable between the first and the second positions under the influence of the inflator.

Many other objects and purposes of the invention will be clear from the following detailed description of the drawings.

DETAILED DESCRIPTION OF THE DRAWINGS

The present invention solves the deficiencies of the prior art by presenting an air bag module that contains an apparatus for nearly instantaneously causing the inflator to vent outside of the module, while also allowing the cushion to quickly vent from the rear of the module.

Figure 1:
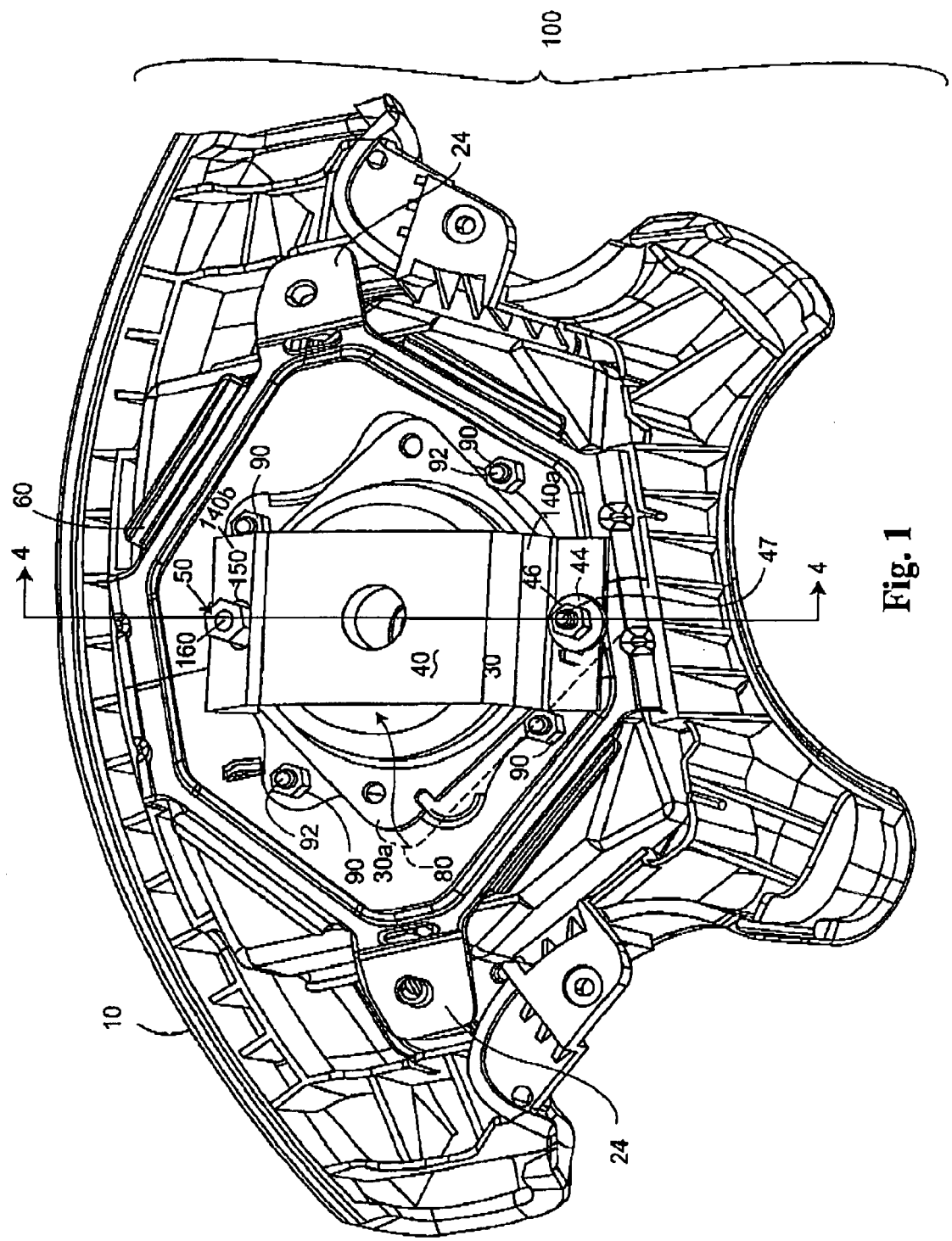
FIG. 1 is an isometric view of a driver side air bag module incorporating the present invention.

As can be seen in FIG. 1, the present invention consists of an air bag module 100 including an air bag cover 10, air bag 12, a housing 20, inflator 30, a moveable inflator strap (also referred to as a brace or bracket) and separation cylinder assembly 50, and fastening mechanisms including a cover bracket 60, a fixable inflator retention nut 44 and washer 46, a retaining ring schematically shown at 80, housing and retaining ring nuts 90 and associated threaded bolts 92.

Figure 4:
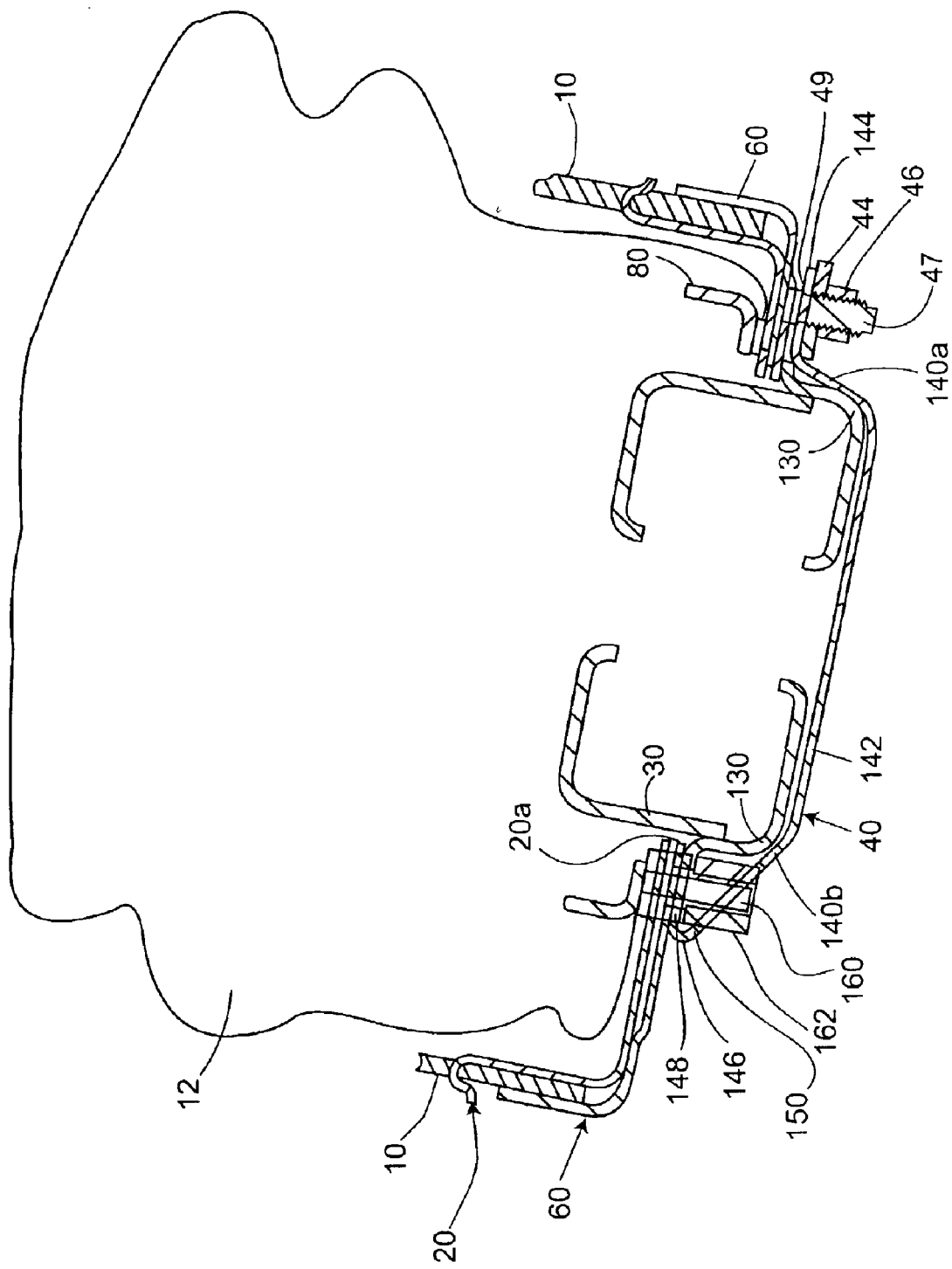
FIG. 4 is a cross-sectional view taken through section line 4—4 of FIG. 1.

Reference is briefly made to FIGS. 1 and 4, which show many of the major components of the present invention. In FIG. 4 a retaining ring 80 is shown received within an opening in the neck of the air bag 12 (in a conventional manner). The retaining ring 80 clamps the neck of the air bag against a nearby housing surface. As the cushion deploys, the cushion is retained by this retaining ring 80, that is, after the cover 10 has been moved out of the way of the inflating air bag. The retaining ring 80 is fixed to the housing 20 by a plurality of threaded fasteners 92 and corresponding nuts 90 also in a known manner. The fasteners 92 can extend from the retaining ring 80 and extend through small holes in the air bag and in the housing. The nuts 92 are received upon the fasteners 90. In the prior art, the fasteners 92 would have also extended through small openings in the flange 30a of the inflator 30, which is not the case in the present invention. The housing 20 includes a number of other features including opposing flanges 24 with holes therein to facilitate connection of the housing to a steering wheel (not shown).

The inflator 30, as is typical of the construction of driver side inflators, is partially received within a central opening 20a of the housing 20. In this mounted orientation the inflator's inflation ports (also called exit ports) 32 are located within the air bag 12. In the present invention, the inflator 30 is not secured to the housing 20 by the fasteners (90,92) associated with the retaining ring 80, housing and inflator flange. The inflator 30 of the present invention is loosely or removably mounted to the housing. The inflator is mounted to the housing in such a way to create a seal about the housing opening 20a to prevent the blow-by of inflation gas (as long as the inflator stays in place). The inflator 30 is prevented from moving rearward relative to the rear of the module (or housing) by at least one inflator strap 40.

Figure 2:
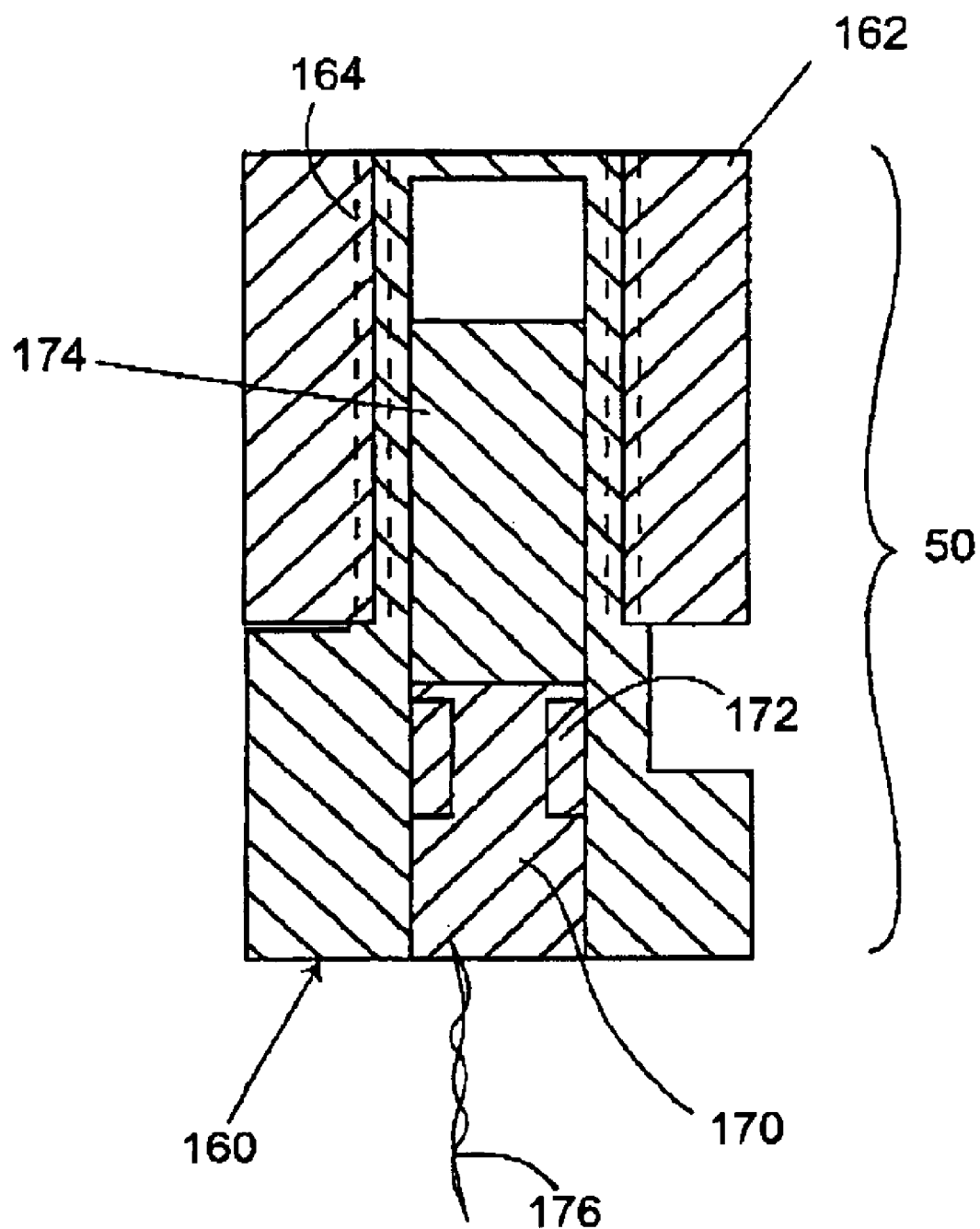
FIG. 2 is a cross-sectional view of a separation cylinder.

In the preferred embodiment of the invention the strap 40 is made from steel such as spring steel. One side of the inflator strap 40 is removably held relative to the housing 20 or to the cover bracket 60 by the separation cylinder assembly 50, which is described in greater detail in conjunction with FIG. 2. As can be seen, the inflator strap 40 bridges the housing opening 20a as well as bridges the rear of the inflator 30. This cooperation essentially locks (at least temporarily) or otherwise holds the inflator in place. The inflator strap 40 is positively secured relative to the cover bracket or to the housing along a side opposite the separation cylinder assembly 50 by a washer 44 and the fixable inflator retaining nut 46. The washer 44 and nut 46 are received upon a threaded retaining fastener 47, which extends from a part of the module such as the cover bracket 60 or the housing. As illustrated the fastener 47 extends from the cover bracket 60. The washer, nut and fastener can be replaced by a weld or rivet or the like. Alternatively, the fastener 47 can extend from the housing 20 or a housing-retaining ring fastener 92 can be used.

The strap 40 includes a center portion 142, in contact with the rear of the inflator 30 and which biases the inflator into the housing. The retention strap 40 also includes first and second legs or ends 140a and 140b. Leg 140a includes a radially extending flange or portion 144 having a hole therein for receipt of fastener 47. This flange 144 is held from outward movement relative to the cover bracket or to the housing by the washer 44 and the fixable inflator retaining nut 46. Leg 140b is secured to the cover bracket 60 or to the housing 20 by a separation cylinder assembly 50. Leg 140b includes a bent-over portion; numeral 146 designates the bend in the strap. Strap portions 146a and 146b are located on either side of the bend 146. Portion 146a includes a small opening 148 and portion 146b includes a larger diameter opening 150.

Reference is briefly made to FIGS. 1 and 4, which show many of the major components of the present invention. In FIG. 4 a retaining ring 80 is shown received within an opening in the neck of the air bag 12 (in a conventional manner). The retaining ring 80 clamps the neck of the air bag against a nearby housing surface. As the cushion deploys, the cushion is retained by this retaining ring 80, that is, after the cover 10 has been moved out of the way of the inflating air bag. The retaining ring 80 is fixed to the housing 20 by a plurality of threaded fasteners 92 and corresponding nuts 90 also in a known manner. The fasteners 92 can extend from the retaining ring 80 and extend through small holes in the air bag and in the housing. The nuts 92 are received upon the fasteners 90. In the prior art, the fasteners 92 would have also extended through small openings in the flange 30a of the inflator 30, which is not the case in the present invention. The housing 20 includes a number of other features including opposing flanges 24 with holes therein to facilitate connection of the housing to a steering wheel (not shown).

As can be appreciated, the strap 40 could also be manufactured from a strong, though very flexible material, such as a piece of seat belt webbing. If this were the case, the seat belt type strap would easily conform to the shape of the bottom of the housing to which it is attached and to the inflator and be strong enough to hold the inflator in place until the separation cylinder assembly is activated.

The separation cylinder assembly 50 (also see FIG. 2) consists of a housing 160 (generally made from plastic or a soft metal) which functions as a support for a cooperating nut 162. Each of the nut 162 and support 160 may include mating threads generally shown by numeral 164 to provide for a tightened connection therebetween. Alternately, the nut 162 and support 160 can be press-fit together. The separation cylinder assembly 50 also includes: a pyrotechnic bridge plug 170, an ignition charge 172 (a known type of pyrotechnic material), an RDC (rapid deflagration cord), a fast burning pyrotechnic 174 and a connector wire 176 schematically shown at. When an electrical signal is received from a controller (not shown) the bridge plug ignites the ignition charge, which in turn causes the RDC (or some other propellant charge) to ignite and burn intensely and rapidly. As the RDC is consumed, a great deal of heat is generated. This heat weakens the structural integrity of the support 160 (or the nut 162) permitting the separable nut 162 to be ready to be pushed free of the support 160.

For example, the heat generated can be set to a level sufficient to melt or otherwise destroy the threads or the mutual press-fit connection between the support 160 and the nut 162. In any case, once the structural integrity of the support 170 (or nut) is reduced the nut and the support are effectively disconnected. The prior art is aware of another pyrotechnic element called an "exploding bolt;" this bolt can in concept also be used to selectively secure one side of the inflator strap 40. When a charge imbedded within the bolt is ignited the bolt is caused to crack or shatter. In view of the above when the separation cylinder assembly 50 has been activated, the inflator 30 will no longer be securely retained relative to the housing 20 by the inflator retention strap 40.

During a vehicular accident the inflator 30 is activated, in a known manner, and in general releases or produces inflation gas used to inflate the associated air bag 12 to protect the occupant (including the driver). The inflation gas exits the inflator 30 and enters the air bag 12 through the inflator exit ports 32. During normal operation the air bag is inflated and then deflates within about 100 milli-seconds. As mentioned above some air bags include vents to assist the air bag in deflating.

In many operational situations it would be desirable to control the rate of inflation of the air bag or the degree to which the air bag is inflated as well as the deflation characteristics of the air bag. These matters can be accomplished by the present invention. Consider a situation in which the capacity of the inflator has been properly chosen to protect the larger 95$^{th}$ percentile male driver or occupant. The air bag inflation characteristics achieved using this type of inflator may not be optimally matched, for example, for a 5$^{th}$ percentile female driver including one such driver sitting extremely close to the steering wheel or even to this larger sized driver seated in an out-of-position seating orientation (such as also seated close to the steering wheel or off to one side).

In these situations it can be desirable to activate the separation cylinder assembly 50 to permit the disassociation of the inflator 30 from the housing 20 to control the inflation of the air bag and/or the deflation of the air bag. During any inflation event when the air bag inflates, the pressure forces act on the interior of the air bag 12 as well as act upon the those surfaces of the inflator 30 inside of the air bag. In the present invention the inflator 30 remains connected to the housing and to the air bag 12 because the strap 40 acts as a mechanical stop preventing disassociation of the inflator from the housing (and air bag). Once the separation (cylinder) assembly 50 is activated one side of the strap 40 is no longer bound to the housing 20. The pressure within the air bag, generated by the inflation gas, acts on the exposed internal surfaces of the inflator 30 and pushes or tends to push the inflator away from the housing 20. In addition to the pressure forces acting on the inflator, the streams of inflation gas exiting the inflator 30 will in general generate a reaction force on the inflator, which also urges the inflator away from the housing. These forces move the inflator at least partially out of opening 20a as the inflator pushes on the now freed side 140 of the strap 40. The inflation gas within the air bag flows therefrom through the space 20b now created between the displaced inflator and the central opening 20a of the housing 20.

Figure 3:
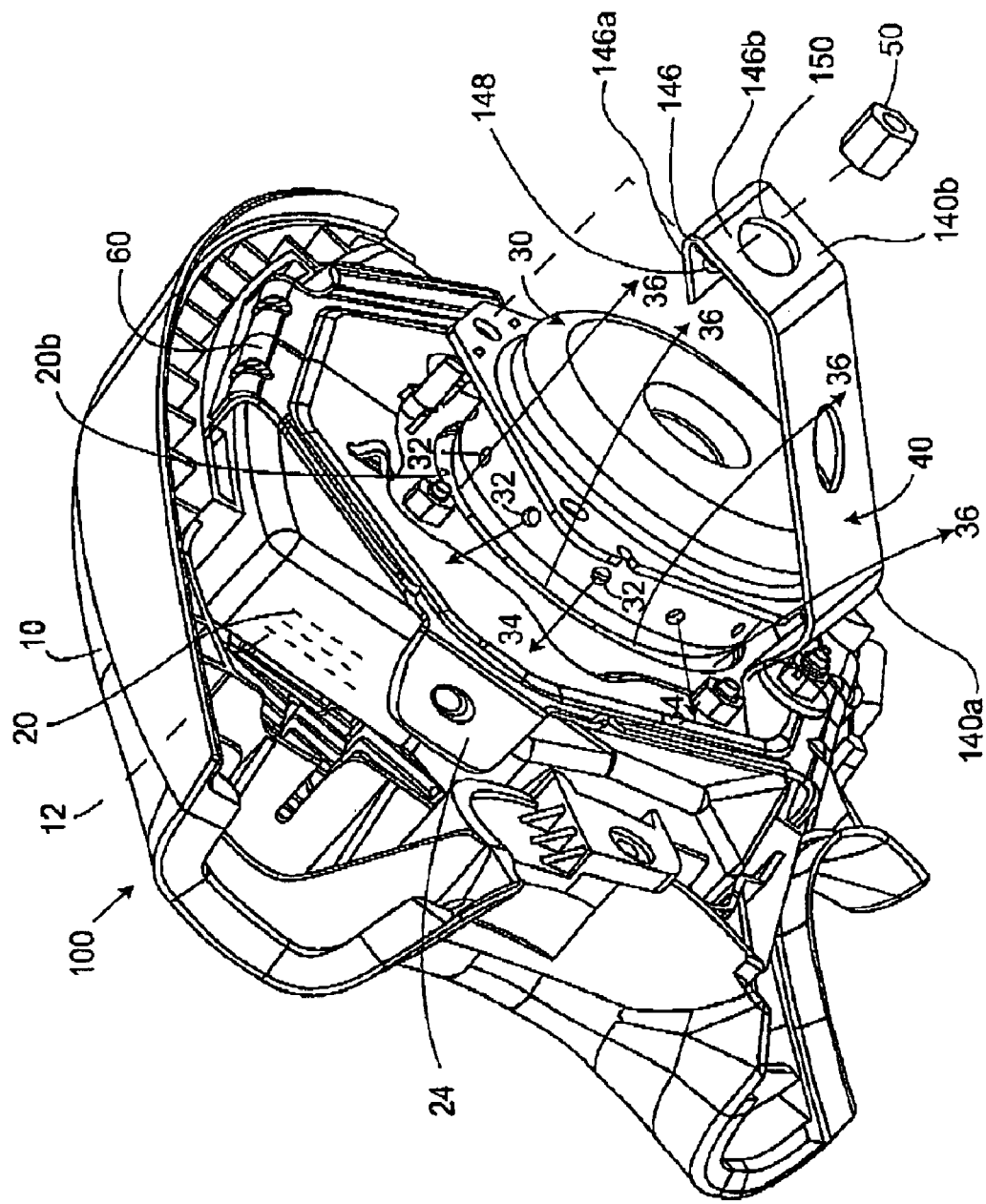
FIG. 3 is an isometric view of the air bag module in its vented condition.

In view of the above forces, which act on the inflator, and further in view of the fact the side or leg 140b of the strap 40 is free to move or be moved, these forces push the inflator rearward away from the housing 20 and the housing's central opening 20a. Side 140b dislodges from the support 160 of the assembly 50 and the strap is free to bend, and/or to more rearward or rotate about the secured end 140a of the strap (which permits the inflator to move rearward), which acts as a hinge (see FIG. 3) as the strap is pushed by the inflator 30. Having opened a vent or space 20b about at least a portion of the inflator, the pressurized gas in the air bag is free to exit therefrom (as shown by arrows 36); additionally, if the inflator is moved sufficiently away from the housing 20, some if not all of the gas exiting the exit ports 32 of the inflator will enter the local atmosphere rather than enter the air bag (as shown by arrows 34, FIG. 3).

Since it is possible to electronically activate the separation cylinder assembly 50 this activation can be done at varied times to accomplish the desired result, for example, at the same time as the inflator is activated. In this mode of operation the inflation capability of the air bag will be decreased as inflation gas will almost continuously be vented. The time the assembly 50 is activated can be delayed relative to the activation of the inflator, or even activated in advance of the inflator. The time difference between activation of the assembly 50 and the inflator 30 can be in proportion to the weight of the driver (occupant) or the occupant's (driver's) seating position (such as by measuring the position of the vehicle seat on the seat track or using an ultrasonic sensor to measure the distance between the steering wheel and the occupant) or to the size of the occupant via some type of occupant classification system.

It is possible to selectively vent the module if an OOP (out-of-position) occupant is detected. One added benefit of the invention is the direction of inflation gas flow exiting from the inflator or the direction of gas vented from the air bag is away from the occupant. In addition, it is now possible to vent the cushion at a predetermined time for an in-position (properly seated) occupant (including a driver). For example, the firing delay is chosen to be sufficiently long, which permits the air bag to become fully inflated, and then with the air bag fully inflated, the assembly 50 is activated. In this manner the operation of the system primarily vents all of the inflation gas from an inflated air bag.

Many changes and modifications in the above-described embodiment of the invention can, of course, be carried out without departing from the scope thereof. Accordingly, that scope is intended to be limited only by the scope of the appended claims.

What is claimed is:

1. An air bag module (100) comprising:
   a housing (20) including a receiving feature (20*a*) to receive at least a portion of an inflator (20), the inflator providing inflation gas to a cooperating air bag;
   the inflator being removably received in the receiving feature (20*a*);
   a holding member (40) movable between a first position and a second position, the holding member, while in the first position operatively holding the inflator (30) to the housing (20), the holding member movable between the first and the second positions under the influence of the inflator;
   wherein the receiving feature comprises an opening (20*a*) in the housing (20) and wherein the holding member includes a bracket which bridges the opening (20*a*) and which urges the inflator (30) onto the housing.

2. The module as defined in claim 1 wherein the bracket comprises a flexible strap (40).

3. The module as defined in claim 1 wherein the bracket comprises a flexible strap made of the spring steel.

4. The module as defined in claim 3 wherein the first end (140*a*) of the strap is relatively fixedly secured in relation to the housing and an opposite end (140*b*) of the strap is removably secured in relation to the housing and wherein a middle portion of the strap is in contact with a portion of the inflator.

5. The module (100) as defined in claim 4 wherein the first end of the strap is loosely secured relative to the housing to facilitate rotation of the strap about the first end.

6. An air bag module (100) comprising:
   a housing (20) including a receiving feature (20*a*) to receive at least a portion of an inflator (20), the inflator providing inflation gas to a cooperating air bag;
   the inflator being removably received in the receiving feature (20*a*);
   a holding member (40) movable between a first position and a second position, the holding member, while in the first position operatively holding the inflator (30) to the housing (20), the holding member movable between the first and the second positions under the influence of the inflator;
   wherein the holding member is at least in part, selectively removable in a timed relation to the activation of the inflator.

7. The module as defined in claim 6 wherein the module is configured to have pressurized inflation gas within the air bag urge the inflator out of the housing to move the holding member a first distance sufficient to permit inflation gas, within the air bag, to be vented to local atmosphere.

8. The module as defined in claim 7 wherein the first distance is sufficient to expose an exit port of the inflator to local atmosphere.

9. An air bag module (100) comprising:
   a housing (20) including receiving a feature (20*a*) to receive at least a portion of an inflator (20), the inflator providing inflation gas to a cooperating air bag;
   the inflator being removably received in the receiving feature (20*a*);
   a holding member (40) movable between a first position and a second position, the holding member, while in the first position operatively holding the inflator (30) to the housing (20), the holding member movable between the first and the second positions under the influence of the inflator;
   wherein the holding member includes at least one side relatively movable in relation to the housing and wherein the module further includes a pyrotechnic element which upon activation disassociates the one side of the holding member relative to the housing.

10. An air bag module (100) with a removable brace or bracket (40) operatively holding an inflator (30) to a housing (20),
    first means being provided to release one of at least a portion of the bracket or cooperating fasteners enabling the bracket to at least partially dislodge from the housing, the module configured to permit the inflator to be pushed out of the housing by the pressure of the inflation gas in the air bag and to vent residual inflation gas emanating from the inflator to local atmosphere through a vent path created by the movement of the inflator.

* * * * *